United States Patent
Nishijima et al.

(10) Patent No.: US 12,445,480 B2
(45) Date of Patent: Oct. 14, 2025

(54) INFORMATION MANAGEMENT SYSTEM, INFORMATION MANAGEMENT METHOD, AND INFORMATION SHARING SYSTEM

(71) Applicant: Hitachi, Ltd., Tokyo (JP)

(72) Inventors: Katsuya Nishijima, Tokyo (JP); Tomohiro Shigemoto, Tokyo (JP); Nobutaka Kawaguchi, Tokyo (JP); Yuki Ueki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 135 days.

(21) Appl. No.: 18/576,130

(22) PCT Filed: Jun. 29, 2022

(86) PCT No.: PCT/JP2022/025990
§ 371 (c)(1),
(2) Date: Jan. 3, 2024

(87) PCT Pub. No.: WO2023/282148
PCT Pub. Date: Jan. 12, 2023

(65) Prior Publication Data
US 2024/0333748 A1    Oct. 3, 2024

(30) Foreign Application Priority Data
Jul. 9, 2021    (JP) .................. 2021-114135

(51) Int. Cl.
*H04L 9/40*    (2022.01)
(52) U.S. Cl.
CPC ...... *H04L 63/1433* (2013.01); *H04L 63/1441* (2013.01)

(58) Field of Classification Search
CPC .................. H04L 63/1433; H04L 63/1441
(Continued)

(56) References Cited

U.S. PATENT DOCUMENTS

2014/0173723 A1    6/2014    Singla et al.
2017/0034023 A1*   2/2017    Nickolov .......... H04L 43/0817
(Continued)

FOREIGN PATENT DOCUMENTS

JP    2019-191657 A    10/2019

OTHER PUBLICATIONS

International Search Report, PCT/JP2022/025990, Sep. 27, 2022, 2 pgs.
(Continued)

*Primary Examiner* — Teshome Hailu
(74) *Attorney, Agent, or Firm* — Volpe Koenig

(57) ABSTRACT

An information management system is provided with a data processing unit that receives, from an information processing apparatus corresponding to a different party, information managed by the different party, calculates a reliability level with respect to the different party, and calculates a confidence level with respect to the information based on the received information and the calculated reliability level, a countermeasure process setting unit that, based on the calculated confidence level, determines details of a countermeasure process with respect to details indicated by the information, and a reliability level updating unit that changes the reliability level based on the details of the countermeasure process, thereby increasing the possibility of effective processing based on information obtained from a different party.

8 Claims, 12 Drawing Sheets

(58) Field of Classification Search
USPC .......................................................... 726/25
See application file for complete search history.

(56) References Cited

U.S. PATENT DOCUMENTS

| | | |
|---|---|---|
| 2018/0063178 A1* | 3/2018 | Jadhav ................ H04L 63/1433 |
| 2019/0166164 A1 | 5/2019 | Yamada et al. |
| 2020/0127821 A1* | 4/2020 | Dolev ................... H04L 9/0861 |
| 2021/0224799 A1* | 7/2021 | Ongpin ................ H04L 63/083 |

OTHER PUBLICATIONS

Extended European Search Report issued on Apr. 4, 2025 for European Patent Application No. 22837564.8.

* cited by examiner

FIG. 3

CONFIDENTIALITY LEVEL TABLE

| ID | DATA NAME | CONFIDENTIALITY LEVEL |
|---|---|---|
| 1 | MALWARE HASH | LOW |
| 2 | SUSPICIOUS CONNECTION DESTINATION LIST | INTERMEDIATE |
| 3 | Web ACCESS LOG | HIGH |
| ⋮ | ⋮ | ⋮ |

FIG. 4

ACCESS CONTROL LIST TABLE

| ORGANIZATION / DATA NAME | ORGANIZATION B | ORGANIZATION C | ... |
|---|---|---|---|
| MALWARE | RAW DATA SHARING | ENCRYPTED SHARING | ... |
| SUSPICIOUS CONNECTION DESTINATION LIST | SHARING OF ONLY COMMON PORTION | SHARING OF ONLY COMMON PORTION | ... |
| Web ACCESS LOG | SHARING OF ONLY DETERMINATION RESULT (Web ACCESS TREND MODEL) | NO SHARING | ... |
| ⋮ | ⋮ | ⋮ | ⋮ |

FIG.5

THREAT INFORMATION TABLE

| ID | THREAT TRACE | CERTAINTY LEVEL |
|---|---|---|
| 1 | aaa.com | 1.0 |
| 2 | bbb.com | 0.5 |
| 3 | ccc.com | 0.3 |
| ⋮ | ⋮ | ⋮ |

COMBINED TABLE 131

| SCORE/ CERTAINTY LEVEL / THREAT TRACE (THREAT INFORMATION) | TRACE INFORMATION PRESENCE OR ABSENCE OF TRACE (ORGANIZATION B) | CERTAINTY LEVEL (ORGANIZATION B) | TRACE INFORMATION PRESENCE OR ABSENCE OF TRACE (ORGANIZATION C) | CERTAINTY LEVEL (ORGANIZATION C) | ... |
|---|---|---|---|---|---|
| aaa.com | 1 | 1.0 | 0 | 0 | ... |
| bbb.com | 1 | 0.5 | 1 | 0.5 | ... |
| ccc.com | 1 | 0.3 | 1 | 0.8 | ... |
| ddd.com | 0 | 0 | 1 | 1.0 | ... |
| ⋮ | ⋮ | ⋮ | ⋮ | ⋮ | ⋮ |

FIG. 8

DETERMINATION RESULT TABLE

| ID | THREAT TRACE | TRUE POSITIVE |
|---|---|---|
| 1 | aaa.com | 1 |
| 2 | bbb.com | 1 |
| 3 | ccc.com | 1 |
| 4 | ddd.com | 0 |
| ⋮ | ⋮ | ⋮ |

RELIABILITY LEVEL TABLE

| ID | ORGANIZATION NAME | TRUE/FALSE SCORE | RELIABILITY LEVEL |
|---|---|---|---|
| 1 | ORGANIZATION B | 1.8 | 0.72 |
| 2 | ORGANIZATION C | 0.3 | 0.12 |
| ⋮ | ⋮ | ⋮ | ⋮ |

FIG.12

SHARING STATUS INFORMATION
DISPLAY SCREEN
1201 http://10.1.0.1/

DISCLOSABLE DATA 1202

| ID | DATA NAME | ORGANIZATION B | ORGANIZATION C | ... |
|---|---|---|---|---|
| 1 | MALWARE HASH | RAW DATA SHARING | RAW DATA SHARING | ... |
| 2 | SUSPICIOUS CONNECTION DESTINATION LIST | RAW DATA SHARING | NO SHARING | ... |
| 3 | WEB ACCESS LOG | SHARING OF ONLY DETERMINATION RESULT | NO SHARING | ... |
| ⋮ | ⋮ | ⋮ | ⋮ | ⋮ |

OBTAINABLE DATA 1203

| ID | DATA NAME | ORGANIZATION B | ORGANIZATION C | ... |
|---|---|---|---|---|
| 1 | MALWARE HASH | RAW DATA SHARING | RAW DATA SHARING | ... |
| 2 | SUSPICIOUS CONNECTION DESTINATION LIST | SHARING OF ONLY COMMON PORTION | SHARING OF ONLY COMMON PORTION | ... |
| 3 | WEB ACCESS LOG | SHARING OF ONLY DETERMINATION RESULT | NO SHARING | ... |
| ⋮ | ⋮ | ⋮ | ⋮ | ⋮ |

INFORMATION MANAGEMENT SYSTEM, INFORMATION MANAGEMENT METHOD, AND INFORMATION SHARING SYSTEM

TECHNICAL FIELD

The present invention pertains to an information management system, an information management method, and an information sharing system.

BACKGROUND ART

Incorporation by Reference

The present application claims priority to Japanese Patent Application No. 2021-114135 filed on Jul. 9, 2021, and incorporates the contents thereof in the present application by reference.

A plurality of organizations may share information and perform various kinds of processing based on shared information, whereby a more beneficial effect is achieved. For example, protecting a network or a system from a cyberattack that suddenly occurs is an indispensable requirement for a security operation. However, it is difficult for only a host organization to hold fast against cyberattacks, which are increasing in scale and cleverness. Conceivably, one defense against a cyberattack is sharing information relating to the cyberattack among a plurality of organizations and taking preliminary countermeasures with respect to the cyberattack based on this shared information.

For example, initiatives for information sharing are being carried out by, inter alia, the Cyber Security Council in the National Center of Incident Readiness and Strategy for Cybersecurity, and ISACS (Information Sharing and Analysis Centers), which are information sharing organizations for various industries. However, there are problems in smoothly proceeding with information sharing. For example, there are cases where an information provider does not wish the fact that they have been subjected to a cyberattack to be known. In addition, information sharing may be inhibited by, inter alia, sensitive information being included in shared information, or not being able to find benefits in sharing information.

JP-2019-191657-A (Patent Document 1) teaches a technique that pertains to sharing of information between organizations. Patent Document 1 discloses that "it is possible to evaluate reported security threat information, and use an evaluation result to make a connection to a reward for the threat information reporter (provider), making it possible to pay the reward by a value corresponding to the reported security threat information. As a result, it is possible to lead to improved motivation for the sharing of security threat information by the provider, thus contributing to sharing secure information quickly and preventing incidents."

PRIOR ART DOCUMENTS

Patent Documents

Patent Document 1: JP-2019-191657-A

SUMMARY OF THE INVENTION

Problem to be Solved by the Invention

Patent Document 1 discloses evaluating reported information and using a result of this evaluation to make a connection to a reward for an information reporter (provider), whereby information sharing is promoted. However, because an evaluation with respect to the information reporter is not considered, there can be cases where an expected result cannot be achieved (such as not being able to achieve effective measures with respect to obtained information).

Accordingly, an objective of the present invention is to provide an information management system, an information management method, and an information sharing system that can improve the possibility of effective processing based on information obtained from a different party.

Solving the Problem

One aspect of the present invention for solving the above problem is an information management system having a processor and a memory and including a data processing unit that receives, from an information processing apparatus corresponding to a different party, information managed by the different party, calculates a reliability level with respect to the different party, and calculates a confidence level with respect to the information based on the received information and the calculated reliability level, a countermeasure process setting unit that, based on the calculated confidence level, determines details of a countermeasure process with respect to details indicated by the information, and a reliability level updating unit that changes the reliability level based on the details of the countermeasure process.

In addition, one aspect of the present invention for solving the above problem is an information management method executed by an information processing apparatus, including a data process for receiving, from an information processing apparatus corresponding to a different party, information managed by the different party, calculating a reliability level with respect to the different party, and calculating a confidence level with respect to the information based on the received information and the calculated reliability level, a countermeasure process setting process for, based on the calculated confidence level, determining details of a countermeasure process with respect to details indicated by the information, and a reliability level updating process for changing the reliability level based on the details of the countermeasure process.

In addition, one aspect of the present invention for solving the above problem is an information sharing system including a plurality of information management systems each having a processor and a memory, and each including a data processing unit that receives, an from information processing apparatus corresponding to a different party, information managed by the different party, calculates a reliability level with respect to the different party, and calculates a confidence level with respect to the information based on the received information and the calculated reliability level, a countermeasure process setting unit that, based on the calculated confidence level, determines details of a countermeasure process with respect to details indicated by the information, and a reliability level updating unit that changes the reliability level based on the details of the countermeasure process.

Advantages of the Invention

By virtue of the present invention, it is possible to increase the possibility of effective processing based on information obtained from a different party.

Problems, configurations, and effects other than those described above are clarified by the following description of an embodiment.

BRIEF DESCRIPTION OF THE DRAWINGS

FIG. 3 is a view that illustrates an example of a confidentiality level table.

FIG. 4 is a view that illustrates an example of an access control list table.

FIG. 5 is a view that illustrates an example of a threat information table.

FIG. 7 is a view that illustrates an example of details of data in a combined table.

FIG. 8 is a view that illustrates an example of a determination result table.

FIG. 9 is a view that illustrates an example of a reliability level table.

FIG. 12 is a view that illustrates an example of a sharing status information display screen.

DETAILED DESCRIPTION OF EMBODIMENTS

Embodiments of the present invention are described in detail below with reference to the drawings. In the present embodiments, in principle, the same reference symbols are added to the same configurations and repeated description is omitted. Note that the present embodiments are merely examples for realizing the present invention and do not limit the technical scope of the present invention.

The following examples describe a case of taking threat information as an example of information managed by a system, evaluating the threat information by use of a reliability level with respect to the information provider or information providing organization thereof, and controlling details set to a security appliance as processing that corresponds to details indicated by the threat information.

First Embodiment

Figure 1:
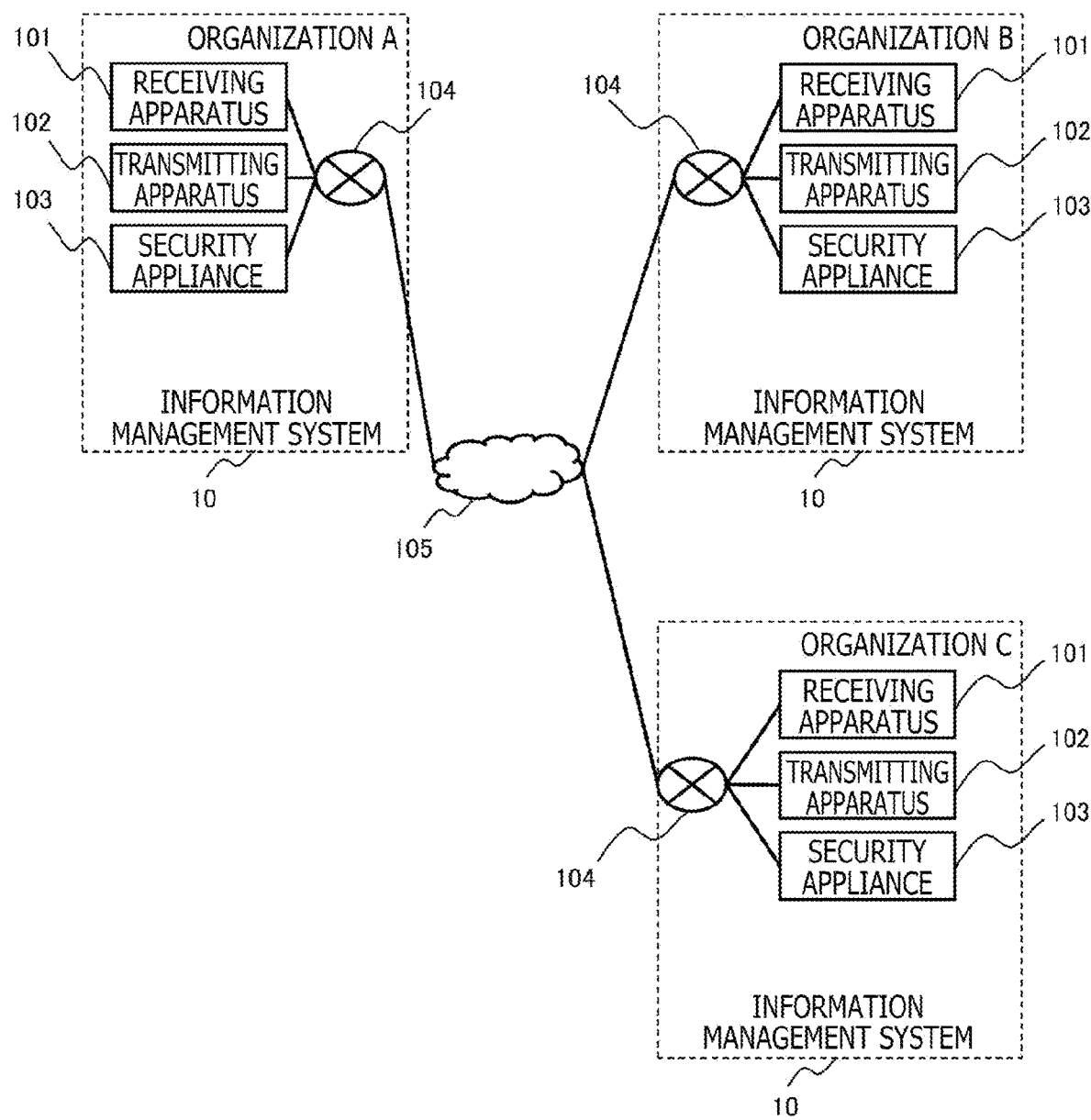
FIG. 1 is a view that illustrates an example of a configuration of an information sharing system according to a first embodiment.

FIG. 1 is a view that illustrates an example of a configuration of an information sharing system 1 according to a first embodiment. This information sharing system 1 includes a plurality of information management systems 10 that are respectively managed by a plurality of organizations (an organization A, an organization B, and an organization C in the present embodiment).

Each information management system 10 manages information (hereinafter, referred to as threat information) pertaining to an unauthorized cyberattack (for example, an unauthorized change or deletion of data, or unauthorized addition of data) with respect to various apparatuses belonging to the organization that manages the information management system 10.

The information sharing system 1 performs a security operation after collecting and combining items of threat information provided from each information management system 10 managed by a different party (such as a different organization or person; referred to as a different organization below). The information sharing system 1 provides, to each information management system 10 that has provided the threat information, information that is for handling the threat and that corresponds to the accuracy of the threat information. By virtue of such a mechanism, the more beneficial the threat information being provided, the more beneficial the countermeasure information each organization can receive.

Note that, in a case where there is one different organization, the information sharing system 1 evaluates, based on a reliability level (accuracy here), threat information provided from the corresponding information management system 10 and provides information for handling the threat to the information management system 10.

Specifically, the information management system 10 is provided with various information processing apparatuses, including a receiving apparatus 101 that receives, inter alia, threat information, a transmitting apparatus 102 that transmits, inter alia, threat information, and a security appliance 103 (a security monitoring server) that performs, inter alia, defense pertaining to threat information, and these are interconnected in a manner that enables communication via a network 104. In addition, the information management systems 10 are communicably connected via a network 105. Note that the receiving apparatus 101 and the transmitting apparatus 102 may be different information processing apparatuses or may be configured as an integral information processing apparatus (an information sharing management apparatus).

Note that the networks 104 and 105 are, for example, each a wired LAN (Local Area Network), a wireless LAN, the internet, a dedicated line, or the like.

Figure 2:
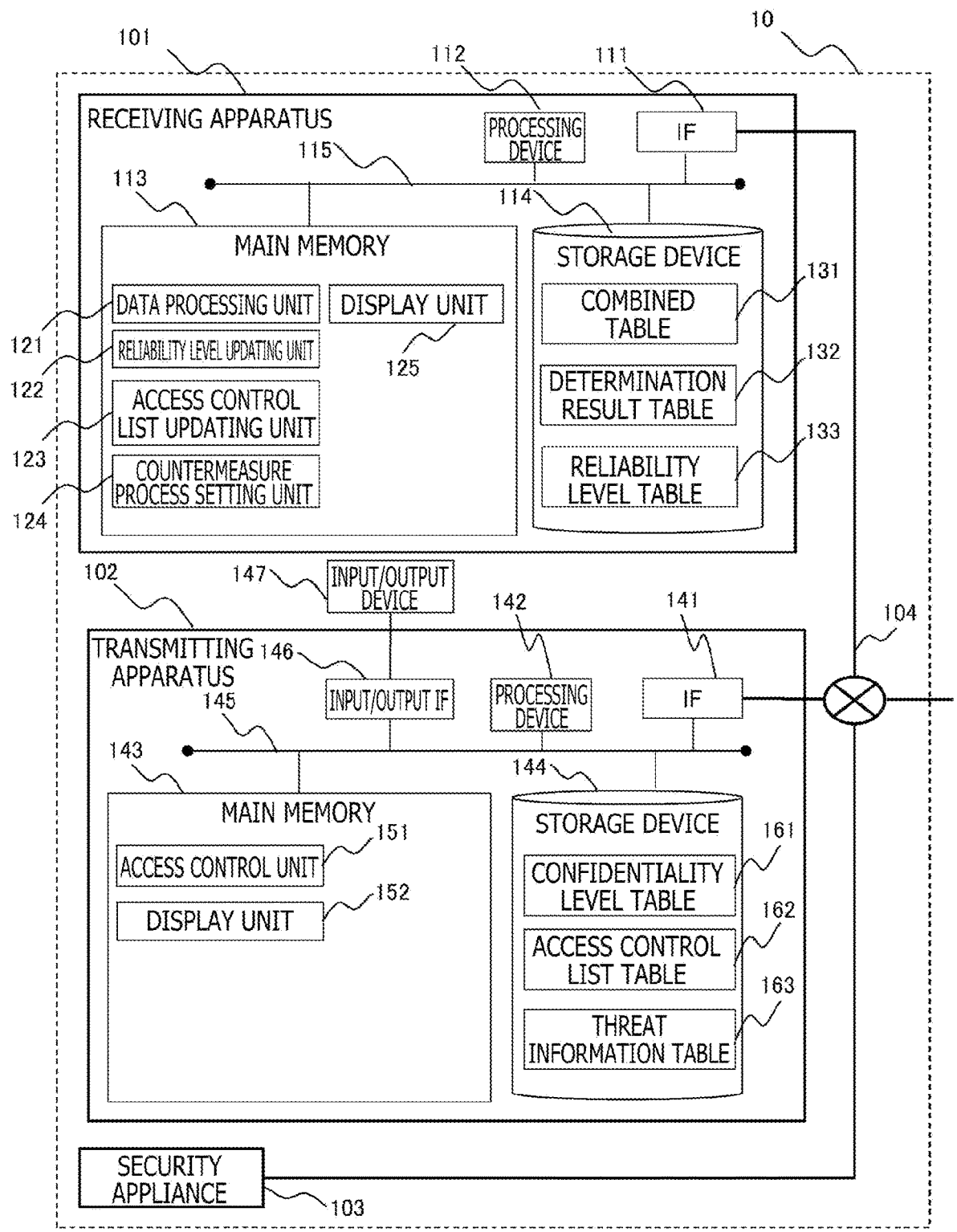
FIG. 2 is a view for describing an example of configurations of a receiving apparatus, a transmitting apparatus, and a security appliance.

Next, FIG. 2 is a view for describing an example of configurations of the receiving apparatus 101, the transmitting apparatus 102, and the security appliance 103.

First, the receiving apparatus 101 is provided with, as hardware, a communication IF 111 (communication interface), a processing device 112, a main memory 113, a storage device 114, and a communication channel 115 that connects these.

The communication IF 111 is, inter alia, a network interface card (Network Interface Card: NIC), a wireless communication module, a USB (Universal Serial Interface) module, or a serial communication module. The processing device 112 is, inter alia, a CPU (Central Processing Unit), an MPU (Micro Processing Unit), or a GPU (Graphics Processing Unit). The main memory 113 is a semiconductor storage device such as a ROM (Read-Only Memory) or a RAM (Random-Access Memory). The storage device 114 is, inter alia, a magnetic storage device or a semiconductor storage device such as a hard disk drive (Hard Disk Drive), a flash memory (Flash Memory), or an SSD (Solid-State Drive). The communication channel 115 is an information transmission medium such as a bus or a cable, for example.

The receiving apparatus 101 is provided with various functional units (programs) that are a data processing unit 121, a reliability level updating unit 122, an access control list updating unit 123, a countermeasure process setting unit 124, and a display unit 125.

The data processing unit 121 is a program that processes or combines items of data obtained from the transmitting apparatus 102 at each of a plurality of different organizations and creates or updates a combined table 131 that is described below.

The reliability level updating unit 122 is a program that uses a determination result, which is obtained as a result of operating the security appliance 103, and the later-described combined table 131 to create or update a reliability level table 133 that is described below.

The access control list updating unit 123 is a program that uses the later-described reliability level table 133 to create or update an access control list table 162 that is described below.

The countermeasure process setting unit 124 is a program that uses the later-described combined table 131 to perform settings for a security appliance.

The display unit 125 is a program that performs, inter alia, display of a screen that is described below and processing of input with respect to the screen.

In addition, the receiving apparatus 101 stores various items of data that are the combined table 131, a determination result table 132, and the reliability level table 133.

The combined table 131 stores information resulting from combining items of threat information (specifically, a threat information table 163 described below) obtained from another information management system 10.

The determination result table 132 stores information pertaining to whether a threat indicated by each item of threat information in the combined table 131 has actually been a threat (whether the threat information actually indicates the presence of wrongdoing; hereinafter, refers to a true positive).

The reliability level table 133 stores information pertaining to a level of reliability (hereinafter, referred to as a reliability level) that the host organization has with respect to a different organization. Details of the combined table 131, the determination result table 132, and the reliability level table 133 are described below.

Note that, although details are described below, the reliability level that the host organization has with respect to a different organization is a parameter, the value of which rises in a case where information provided from the different organization to the host organization is beneficial and drops in a case where the information is erroneous. The reliability level is used when determining a scope of information to provided from the host organization to the different organization. In other words, the host organization provides more information by a simpler method to a different organization having a high reliability level, and provides less information, by a more complicated method using such processing as encryption or anonymization, to a different organization having a low reliability level. In addition, the reliability level is also used in order to set details of processing to be performed by the security appliance 103. In other words, in a case where the reliability level of threat information provided from a different organization is high, the information management system 10 trusts the different organization, and sets a high security level such as blocking communication or deleting data in relation to this threat information. In contrast, in a case where the reliability level of threat information provided from a different organization is low, the information management system 10 does not trust this different organization (treats the different organization as having many misdetections), and sets a low security level that corresponds to this reliability level, for example, makes a setting for executing detection of a threat.

The above functionality of the receiving apparatus 101 is realized by hardware in the receiving apparatus 101, or by the processing device 112 reading out and executing a program stored in the main memory 113 or the storage device 114. In addition, some or all of the programs or data described above, for example, can be stored in the main memory 113 or the storage device 114 from a readable non-transitory recording medium or from another apparatus that is provided with a non-transitory storage device, via the network 104.

Next, the transmitting apparatus 102 is provided with, as hardware, a communication IF 141 for use in communication with the receiving apparatus 101, a processing device 142, a main memory 143, a storage device 144, and a communication channel 145 that connects these. In addition, the transmitting apparatus 102 is provided with an input/output IF 146. The input/output IF 146 is connected to an input/output device 147 that is a keyboard, a display, or the like and is for performing input/output, and intermediates input and output of data to and from the input/output device 147.

The transmitting apparatus 102 is provided with various functional units (programs) that are an access control unit 151 and a display unit 152. The access control unit 151, in the case of having received a data obtainment request from the receiving apparatus 101 in another information management system 10, performs processing in accordance with a policy indicated by the later-described access control list table 162.

The display unit 152 is a program that performs, inter alia, display of a screen that is described below, and processing of input with respect to the screen.

In addition, the transmitting apparatus 102 stores various items of data that are a confidentiality level table 161, the access control list table 162, and the threat information table 163.

(Confidentiality Level Table)

FIG. 3 is a view that illustrates an example of the confidentiality level table 161. The confidentiality level table 161 has various data items that are an ID 301 for a record, a data name 302 that is set to a name of held data that a host organization manages or holds, and a confidentiality level 303 that is set to a level of confidentiality for data pertaining to the data name 302. Note that the confidentiality level 303 may be set manually by an administrator, or may be set automatically based on details of the held data, such as increasing the level of confidentiality in a case where the held data includes personal information, for example. The confidentiality level table 161 is used by a process that generates and updates the access control list table 162, which is described below.

(Access Control List Table)

FIG. 4 is a view that illustrates an example of the access control list table 162. The access control list table 162 stores an information provision method 1623 for a case in which the host organization provides each different organization 1621 with each item of held data 1622 that pertains to threat information and belongs to the host organization. This information provision method 1623 is information regarding a scope and details for providing threat information.

For example, as illustrated in the same figure, in a case where the host organization provides "organization B" with "malware data" pertaining to a threat, a malware sample that is raw data (unprocessed data) is shared (raw data sharing 1623a). In a case where the host organization provides "organization C" with "malware data" pertaining to a threat, the raw data is processed using, inter alia, hashing, encryption, or anonymization, and the processed data is shared (encrypted sharing 1623*b*). In contrast, in the case of providing "organization C" with a "suspicious connection destination list," only data common to a suspicious connection destination list held by "organization A," which is the host organization, and threat information such as a suspicious connection destination list for which "organization A" has received a query from "organization C" (sharing of only common portion 1623*c*) is provided.

In addition, "sharing of only determination result" in the information provision method 1623 indicates performing predetermined processing using held data belonging to the host organization, and subsequently providing a different organization with only a result of this processing (sharing of only determination result 1623*d*). In the example in the same figure, the host organization creates a Web access trend model based on a "Web access log" for the host organization, and performs processing for calculating a degree of deviation between access log trends obtained as a result thereof and a "Web access log" presented by a different organization "organization B." The host organization provides only the degree of deviation to "organization B."

Note that the access control list table 162 may be set while an administrator is referring to details in the confidentiality level table 161, or details may be set automatically. In this case, for example, a security level is set in advance for each item of information that can be set for the information provision method 1623 (for example, increasing the security level in an order from raw data sharing, sharing of only common portion, encrypted sharing, sharing of only determination result, and no sharing).

(Threat Information Table)

FIG. 5 is a view that illustrates an example of the threat information table 163. The threat information table 163 stores threat information is that detected by an organization (information management system 10) and is held by that organization, as well as information (hereinafter, referred to as a certainty level) pertaining to a level of certainty that the organization has as to whether the threat information actually indicates a fact regarding a threat (cyberattack).

The threat information table 163 holds various data items that are an ID 501 for a record, a threat trace 502 in which the threat information detected by the information management system 10 is set, and a certainty level 503 to which the certainty level with respect to the threat information is set.

In the present embodiment, the threat trace 502 is set to have data suspected of being subjected to a cyberattack, or a location where this data is present. The threat trace 502 is set to have, inter alia, an IoC (Indicator of Compromise), for example. Specifically, the threat trace 502 is set to have, inter alia, information regarding a suspicious connection destination domain, an IP address, a URL (Uniform Resource Locator), a registry changed by an attack, the name of a process used, or an email. Note that other information may be set for the threat trace 502 if it is information indicating a ground for a threat. In addition, the certainty level 503 may be set to a value for a certainty level by a user or may be set automatically.

The above functionality of the transmitting apparatus 102 is realized by hardware in the transmitting apparatus 102, or by the processing device 142 reading out and executing a program stored in the main memory 143 or the storage device 144. In addition, some or all of the programs or data described above, for example, can be stored in the main memory 143 or the storage device 144 from a readable non-transitory recording medium or from another apparatus that is provided with a non-transitory storage device, via the network 104.

Note that the receiving apparatus 101 and the transmitting apparatus 102 described here may be different information processing apparatuses or may be integrally configured.

Next, the security appliance 103 performs a countermeasure process with respect to a cyberattack. For example, the security appliance 103 blocks unregulated communication and dangerous communication and stops suspicious processes, with, for example, a FW (Fire Wall), an IPS (Intrusion Prevent System), or EDR (Endpoint Detection and Response). In addition, the security appliance 103 detects unregulated communication and dangerous communication as well as suspicious processes, with, for example, an IDS (Intrusion Detection System) or SIEM (Security Information Event Management).

The security appliance 103 performs a countermeasure process with respect to a threat based on the later-described combined table 131 or reliability level table 133, or a predefined threshold. For example, the security appliance 103 blocks or detects a connection to a specific domain, or stops or detects a specific process. The security appliance 103 stores results of this. These results are used to create and update the determination result table 132, which is described below.

Next, description is given regarding processing performed by the information sharing system 1.

<Outline of Processes>

Figure 6:
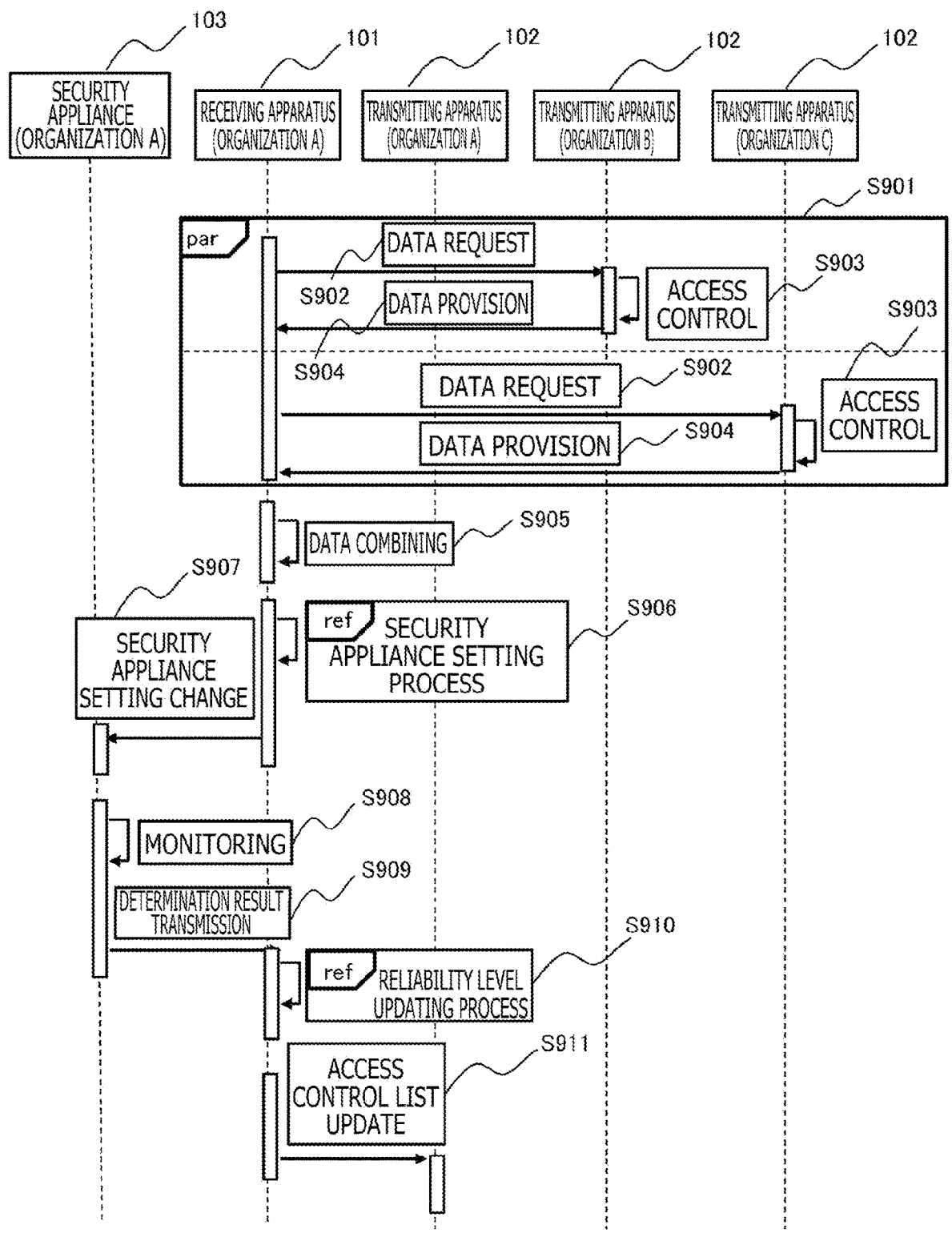
FIG. 6 is a sequence diagram for describing an outline of a threat information sharing process.

FIG. 6 is a sequence diagram for describing an outline of a threat information sharing process performed by the information sharing system 1. The threat information sharing process is, for example, started at a timing designated by a user or at a predetermined timing (for example, at a predetermined time interval, or at a predetermined time).

First, the receiving apparatus 101 for each organization requests the transmitting apparatus 102 in each different organization to provide threat information (S901: S902 to S904).

In other words, the receiving apparatus 101 in each organization transmits a threat information data obtainment request to the transmitting apparatus 102 in each different organization (S902).

The data obtainment request, for example, includes a designation pertaining to details of data for which obtainment is requested and/or a method of providing the data. In a case where the designation is for the details of data, for example, included is a designation of a suspicious connection destination list. In a case in which the designation is for a data provision method, for example, included is a designation of "sharing of only common portion." In this case, the data obtainment request may include information (for example, a connection destination list) for identifying the common portion.

The access control unit 151 in the transmitting apparatus 102 for each organization, upon receiving the data obtainment request, refers to the access control list table 162 and determines disclosure details for data indicated by the received data obtainment request (S903). Specifically, the access control unit 151 searches the access control list table 162 for threat information identified by the data provision method and data details indicated by the received data obtainment request.

In the case of disclosing data, each transmitting apparatus 102 obtains, from the threat information table 163, data (threat information and the certainty level thereof) for the disclosure details determined in S903, and uses the method indicated by the access control list table 162 to transmit the obtained data to the receiving apparatus 101 that is the transmission source of the data obtainment request (S904).

Subsequently, the data processing unit 121 in the receiving apparatus 101 in each organization combines the data items from each organization that have been received in S904, to thereby create or update the combined table 131 (S905).

(Combined Table)

FIG. 7 is a view that illustrates an example of details of data in the combined table 131. The combined table 131 combines items of information included in the threat information table 163 received from a plurality of different organizations.

For the combined table 131, each organization stores, in relation to each item of threat information 1311, trace information 1312 that indicates whether there is a trace for that threat information, and a certainty level 1313 with respect to that threat information. In relation to the trace information 1312, which is regarding whether there is threat information, for example, 1 is set in a case where there is threat information, and 0 is set in a case where there is no threat information.

The example in the same figure illustrates a case in which, to the receiving apparatus 101 belonging to "organization A" which is the host organization, the transmitting apparatus 102 belonging to "organization B" has transmitted the items of threat information "aaa.com," "bbb.com," and "ccc.com" and the transmitting apparatus 102 belonging to "organization C" has transmitted the items of threat information "bbb.com," "ccc.com," and "ddd.com."

Next, as illustrated in FIG. 6, the countermeasure process setting unit 124 in the receiving apparatus 101 belonging to each organization refers to the combined table 131 generated in S905 and executes a security appliance setting process for generating a setting for a security appliance (S906). Details of the security appliance setting process S906 are described below.

The countermeasure process setting unit 124 in the receiving apparatus 101 belonging to each organization transmits instruction information for the setting for the security appliance to the security appliance 103 (S907).

The security appliance 103, having received the instruction information, performs a countermeasure process (such as monitoring) with respect to the threat information, in accordance with a condition indicated by the instruction information (S908).

An example of monitoring is, for example, the security appliance 103 detecting "aaa.com" which is a suspicious connection destination domain. In a case where a connection to "aaa.com" from an external apparatus cannot be detected for a predetermined time period, the security appliance 103 stores that a threat does not actually exist, and sets this as a determination result. In contrast, in a case where a connection to "aaa.com" from an external apparatus is detected, the security appliance 103 stores that this connection is a suspicious connection (actually a threat), and sets this as a determination result. In this case, the security appliance 103 determines whether a connection to "aaa.com" is actually a threat pertaining to a cyberattack or is normal processing (in other words, a misdetection). Note that, instead of the result of an actual security operation, the security appliance 103 may obtain a determination result by using malignant data that should be detected and benign data that does not need to be detected, which are prepared in advance, as comparative data with respect to the above-described connection from an external apparatus.

The security appliance 103 transmits the determination result obtained as a result of the monitoring in S908 to the receiving apparatus 101 that is the transmission source of the instruction information (S909). The receiving apparatus 101 records the received determination result in the determination result table 132.

(Determination Result Table)

FIG. 8 is a view that illustrates an example of the determination result table 132. The determination result table 132 has various data items that are an ID 701 for a record, a threat trace 702 in which threat information is set, and a true positive 703 that is set to have information regarding a true positive and indicates whether the threat indicated by the threat information has actually been a threat (unauthorized information processing such as a cyberattack).

The threat trace 702 stores, from among items of threat information recorded in the combined table 131, those detected by the security appliance 103. In addition, the true positive 703 is set to have information regarding a true positive based on a detection result by the security appliance 103. In other words, it is set to "1" in a case where a result of detection is that there has actually been a threat, and set to "0" in a case where a result of detection is that there has not actually been a threat.

Next, as illustrated in FIG. 6, the reliability level updating unit 122 in the receiving apparatus 101 in each organization performs a reliability level table update process that creates or updates the reliability level table 133, based on a determination result obtained from the security appliance 103 (S910). The reliability level updating unit 122 in this reliability level table update process S910 creates or updates the reliability level table 133 based on the determination result table 132 generated in S909. Details of the reliability level table update process S910 are described below.

(Reliability Level Table)

FIG. 9 is a view that illustrates an example of the reliability level table 133. The reliability level table 133 has various data items that are an ID 801 for each record, an organization name 802 that is set to have information regarding an organization that will be the target of a reliability level, a true/false score 803 that is set to have information (hereinafter, referred to as a true/false score) pertaining to a degree of accuracy of threat information provided from the organization corresponding to the organization name 802, and a reliability level 804 that is set to a reliability level that the host organization has with respect to the different organization corresponding to the organization name 802. The reliability level 804 is set to a value resulting from normalizing the true/false score 803. Note that, in a case where the value of a true/false score is less than 0, it may be that a data item for the true/false score 803 is set to 0.

In addition, as illustrated in FIG. 6, the access control list updating unit 123 in the receiving apparatus 101 for each organization, based on the confidentiality level table 161 and the reliability level table 133, updates the access control list table 162 in the transmitting apparatus 102 for the respective organization (S911).

For example, the access control list updating unit 123 displays details of the confidentiality level table 161 and the reliability level table 133 and accepts a correction of the access control list table 162 from a user.

In addition, the access control list updating unit 123 may automatically correct the access control list table 162. For example, for each different organization, the access control list updating unit 123 multiplies a reliability level with respect to the different organization by a confidentiality level (the confidentiality level stored in the confidentiality level table 161) from the host organization to thereby calculate an index value that indicates a level (such as a confidentiality level) for details or the breadth of an information sharing scope. The access control list updating unit 123 compares this index value with a security value associated to each item of information (for example, raw data sharing, sharing of only common portion, encrypted sharing, sharing of only determination result, and no sharing) that can be set for the information provision method 1623, to thereby identify the details of the information provision method 1623 having a security value corresponding to the index value.

Note that the calculation method described here is an example, and the access control list updating unit 123 can, based on a confidentiality level indicated by the confidentiality level table 161 and a reliability level indicated by the reliability level table 133, update the access control list table 162, which has information provision information regarding an appropriate scope and appropriate details.

The threat information sharing process hereby ends.

<Security Appliance Setting Process>

Figure 10:
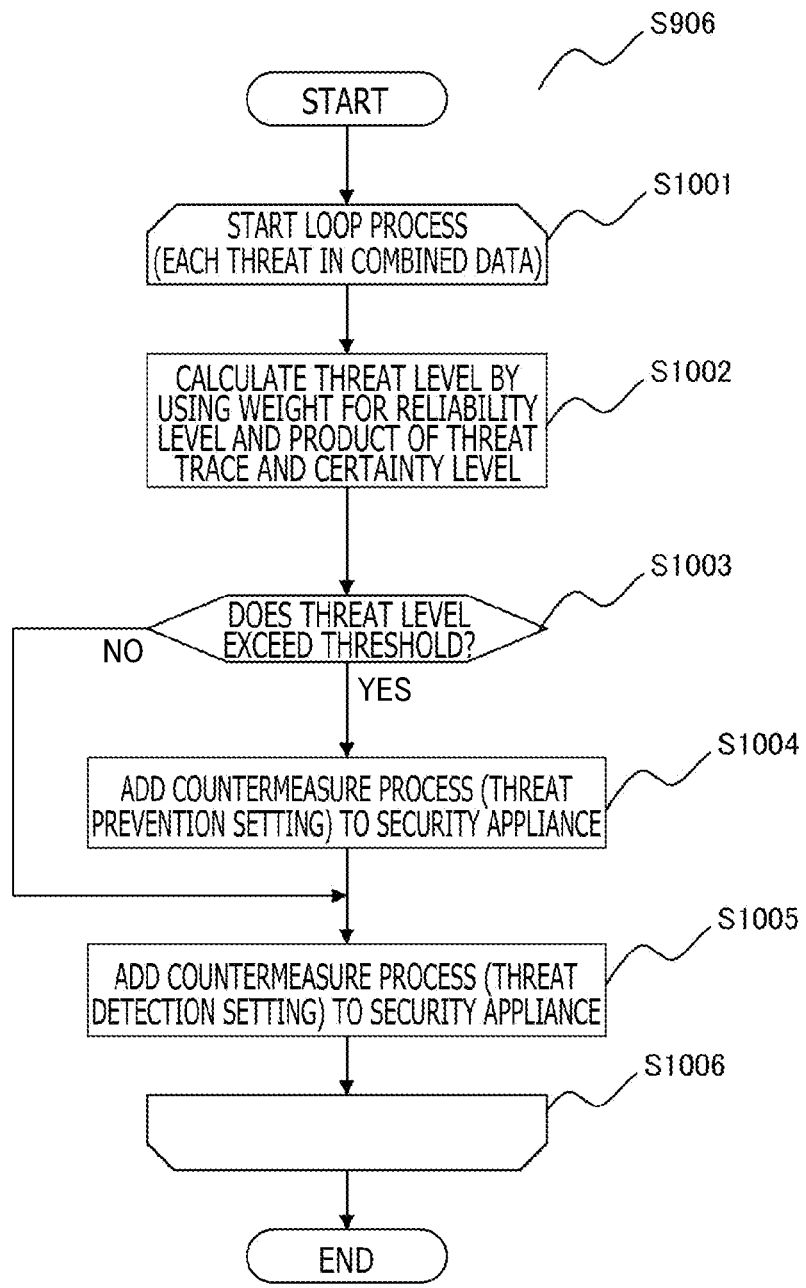
FIG. 10 is a flow chart for describing details of a security appliance setting process.

FIG. 10 is a flow chart for describing details of the security appliance setting process S906.

The countermeasure process setting unit 124 repeats S1002 through S1005 in relation to each item of threat information set in the combined table 131.

In other words, the countermeasure process setting unit 124 first selects one item of threat information stored in the combined table 131 (specifically, selects one record from the combined table 131) and obtains a certainty level held by each organization with respect to the selected threat information (hereinafter, referred to as selected threat information) and a reliability level with respect to each organization. Based on the obtained certainty level held by each organization and reliability level with respect to each organization, the countermeasure process setting unit 124 calculates a threat level (reliability level with respect to threat information; may be referred to as a level of confidence below), which is a parameter that indicates the magnitude of the threat indicated by the selected threat information (S1002). In the present embodiment, the countermeasure process setting unit 124 calculates the threat level (level of confidence) by using the following formula, which uses a weighted average.

[Math. 1]
$$\sum_i E_i \times C_i \times T_i \quad (1)$$

Here, $E_i$ is trace information for a (different) organization i (1 in the case where there is a trace, and 0 in a case where there is no trace), $C_i$ is the certainty level held by the (different) organization i, and $T_i$ is the reliability level with respect to the (different) organization i.

In the example in FIG. 7 and FIG. 9, a threat level with respect to selected threat information "aaa.com" will be 0.72, and a threat level with respect to selected threat information "bbb.com" will be 0.42.

Note that the threat level (confidence level) is calculated here in reference to a weighted average that employs a reliability level T as a weight, but there may be another method.

The countermeasure process setting unit 124 determines whether the threat level calculated in S1002 exceeds a predefined threshold (S1003). In a case where the threat level is less than or equal to the threshold (S1003: NO), the countermeasure process setting unit 124 executes the processing in S1005. In contrast, in a case where the threat level exceeds the threshold (S1003: YES), the countermeasure process setting unit 124 executes the processing in S1004.

In S1004, the countermeasure process setting unit 124 adds a setting to the security appliance 103 in order to prevent access to a location indicated by the selected threat information. Note that, in this case, the countermeasure process setting unit 124 may allow a user to confirm whether to add this setting.

For example, in a case where the selected threat information is "suspicious connection destination domain," the countermeasure process setting unit 124 generates setting information for blocking access to this connection destination domain. In addition, in a case where the selected threat information is "suspicious file name," the countermeasure process setting unit 124 generates setting information for deleting this file. Subsequently, the processing in S1005 is performed.

In S1005, the countermeasure process setting unit 124 adds a setting to the security appliance 103 in order to detect access to a location indicated by the selected threat information.

The countermeasure process setting unit 124 repeats the above processing for all items of threat information set in the combined table 131 (S1006).

Note that, in the above example, description has been given for a countermeasure process for prevention and detection with respect to threat information (S1004 and S1005), but the countermeasure process setting unit 124 may perform, inter alia, any other countermeasure process (notification, output of a log).

<Reliability Level Updating Process>

Figure 11:
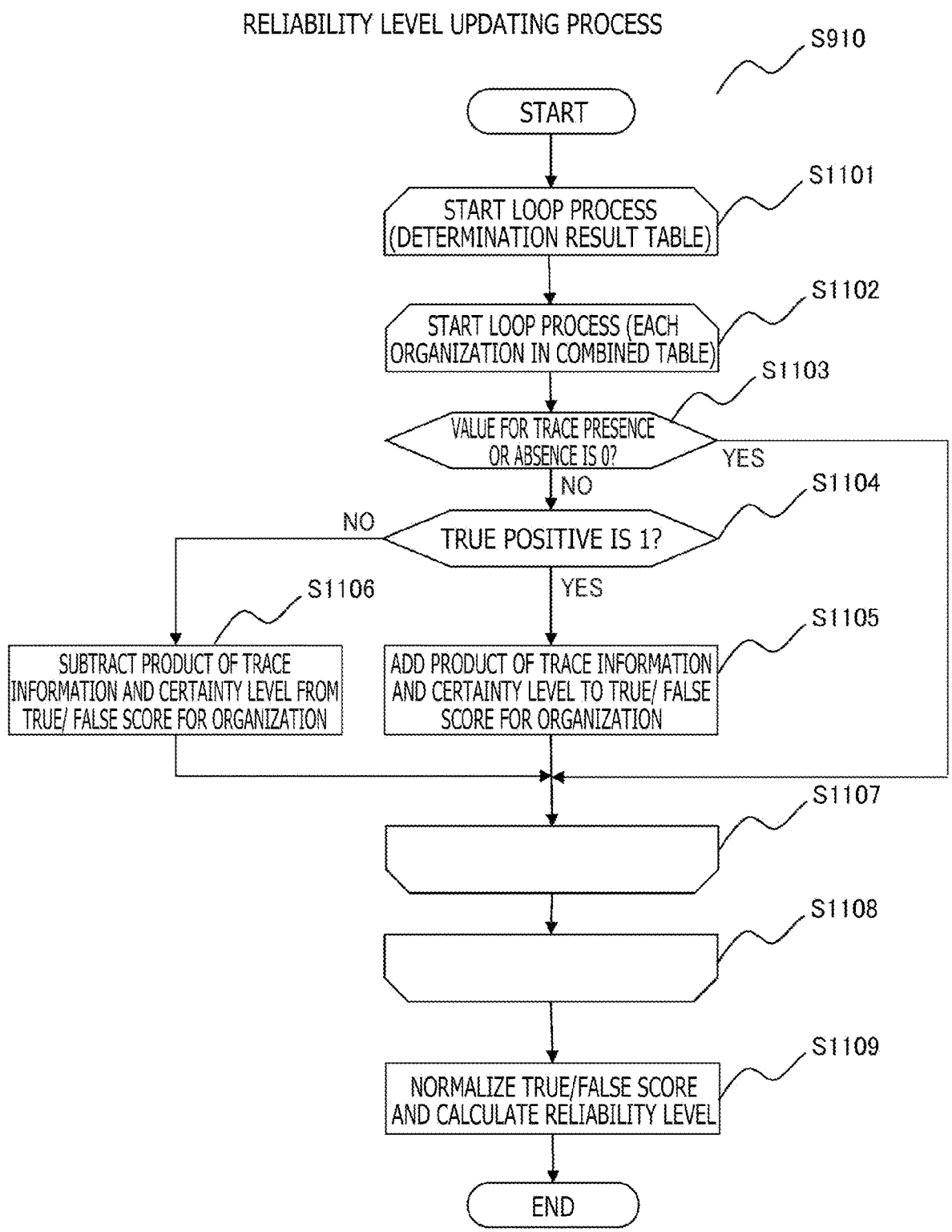
FIG. 11 is a flow chart for describing an example of a reliability level updating process.

FIG. 11 is a flow chart for describing an example of the reliability level updating process S910.

From among items of threat information recorded in the determination result table 132, the reliability level updating unit 122 selects one item of threat information for which a reliability level has not been calculated (S1101).

In addition, the reliability level updating unit 122 selects one of the organizations recorded in the combined table 131 (S1102).

The reliability level updating unit 122 determines whether it is possible for the organization selected in S1102 (hereinafter, referred to as the selected organization) to have been subjected to the threat indicated by the threat information selected in S1101 (hereinafter, referred to as the selected threat information) (S1103). Specifically, the reliability level updating unit 122 confirms whether, from the combined table 131, the value of the trace information 1312 for a data item corresponding to the selected organization is 1 or 0 for a record corresponding to the selected threat information.

In a case where it is not possible for the selected organization to have been subjected to the threat indicated by the selected threat information (S1103: YES), the reliability level updating unit 122 executes processing for S1107, and in a case where it is possible that the selected organization has been subjected to the threat indicated by the selected threat information (S1103: NO), the reliability level updating unit 122 executes processing for S1104.

In S1104, the reliability level updating unit 122 confirms whether the selected organization has actually been subjected to the threat indicated by the selected threat information, as unauthorized information processing. Specifically, the reliability level updating unit 122 confirms whether the true positive 703 for the record corresponding to the selected threat information is 1 or 0.

In a case where the selected organization has actually been subjected to the threat indicated by the selected threat information as unauthorized information processing (S1104: YES), the reliability level updating unit 122 executes processing for S1105, and in a case where the selected organization has not actually been subjected to the threat indicated by the selected threat information, as unauthorized information processing (S1104: NO), the reliability level updating unit 122 executes processing for S1106.

In S1105, the reliability level updating unit 122 calculates or updates a true/false score for the selected organization in relation to the selected threat information. Specifically, the reliability level updating unit 122 calculates the product of the trace information 1312 for the record corresponding to the selected threat information in the combined table 131 and the certainty level held by the selected organization, and adds this value to the current true/false score for the selected organization. Note that the reliability level updating unit 122 may further multiply the abovementioned product by a severity level for the threat indicated by the selected threat information.

Subsequently, the processing in S1107 is performed.

In S1106, the reliability level updating unit 122 calculates or updates a true/false score for the selected organization in relation to the selected threat information. Specifically, the reliability level updating unit 122 calculates the product of the trace information 1312 for the record corresponding to the selected threat information in the combined table 131 and the certainty level held by the selected organization, and subtracts this value from the current true/false score for the selected organization. Subsequently, the processing in S1107 is performed.

The reliability level updating unit 122 repeats the processing of S1102 through S1106 for all organizations in relation to the selected threat information (S1107).

In addition, the reliability level updating unit 122 repeats the processing of S1101 through S1107 for all items of threat information (S1108).

The reliability level updating unit 122 divides the true/false score, which is for each different organization and is calculated by the processing in S1101 to S1108, by a total value for the true/false scores for all organizations to thereby calculate the reliability level for each different organization. The reliability level updating unit 122 sets the values of the reliability levels that have been calculated for the reliability level 804 of the records corresponding to organizations in the reliability level table 133 to thereby update the reliability level table 133 (S1109).

Here, description is given regarding a specific example of calculating reliability levels, based on the example in FIG. 8 and FIG. 9. First, "aaa.com" is selected as the selected threat information in S1101. Next, "organization B" is selected as the selected organization in S1102. According to the combined table 131, "organization B" has a threat trace for "aaa.com" (S1103: No), and thus S1104 is executed. The determination result table 132 is referred to, and the true positive 703 with respect to "aaa.com" is 1 (S1104: YES). Therefore, the product of the trace information and the certainty level in the combined table 131, in other words, the result of "1×1.0," is added to the existing value for the true/false score 803 for the record corresponding to "organization B" in the reliability level table 133. Next, "organization C" is selected in S1102. According to the combined table 131, "organization C" does not have a threat trace for "aaa.com" (S1103: Yes), and thus the true/false score is not updated. Subsequently, "bbb.com," "ccc.com," and "ddd.com" are sequentially selected in S1101, 0.5 and 0.3 are each added to the true/false score for "organization B," and consequentially the true/false score for "organization B" becomes 1.8 as illustrated in FIG. 9. In contrast, 0.5 and 0.8 are each added to the true/false score for "organization C" and 1.0 is subtracted. Consequentially, the true/false score for "organization C" therefore becomes 0.3 as illustrated in FIG. 9. Assuming the total of true/false scores other than those for "organization B" and "organization C" is 0.4, the total value of true/false scores for all organizations will be 2.5. Accordingly, the reliability level for the organization B becomes 0.72 after dividing 1.8 by 2.5. In addition, the reliability level for the organization C becomes 0.12 after dividing 0.3 by 2.5.

Next, description is given regarding screens displayed by the information management system 10. Note that each screen described below may be displayed by any apparatus in the information management system 10.

<Sharing Status Information Display Screen>

FIG. 12 is a view that illustrates an example of a sharing status information display screen 1201 for displaying data (disclosable data) regarding a scope and details that the host organization can transmit to a different organization, and data (obtainable data) regarding a scope and details that the host organization can receive from a different organization.

The sharing status information display screen 1201 has a disclosable data display field 1202 and an obtainable data display field 1203.

The disclosable data display field 1202 displays details of the access control list table 162 belonging to the host organization. The obtainable data display field 1203 displays the state of data disclosure with respect to the host organization, based on details of the access control list table 162 obtained from a different organization.

Using the sharing status information display screen 1201, users in each organization can easily confirm the scope of information sharing with a different organization, in relation to threat information.

<Sharing Status Detailed Information Display Screen>

Figure 13:
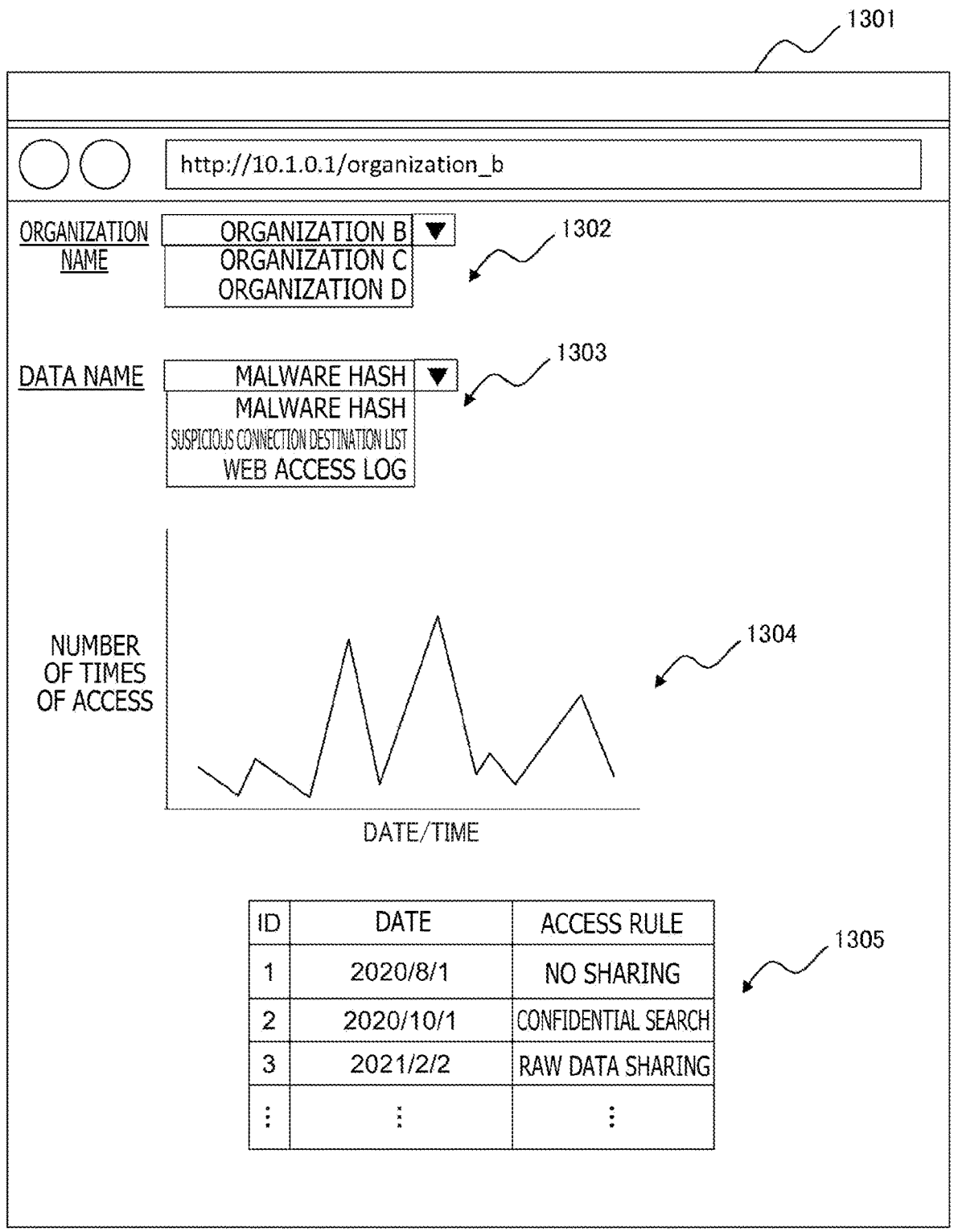
FIG. 13 is a view that illustrates an example of a sharing status detailed information display screen.

FIG. 13 is a view that illustrates an example of a sharing status detailed information display screen 1301 for displaying details of disclosable data and obtainable data.

The sharing status detailed information display screen 1301 is provided with an organization selection field 1302 for accepting, from a user, selection of an organization for which to display information, a data selection field 1303 for selecting data to display, an analysis display field 1304, and a sharing history display field 1305.

The organization selection field 1302 is for a user to select an organization from organizations being displayed in the disclosable data display field 1202 and the obtainable data display field 1203 in the sharing status information display screen 1201. Note that the organization selection field 1302 may be for selecting an organization by a pull-down method.

The data selection field 1303 is for a user to select threat information from among items of threat information. Note that the data selection field 1303 may be for selecting threat information by a pull-down method or may display a list of threat information items therein.

The analysis display field 1304 expresses an analysis result pertaining to access for threat information specified in reference to the organization selection field 1302 and the data selection field 1303. For example, the analysis display field 1304 displays a transition (history) for each day, for the number of times that the different organization selected in the organization selection field 1302 has accessed the host organization (transmission and reception of a data obtainment request), with respect to the threat information selected in the data selection field 1303. Note that, instead of the number of times that a different organization has accessed the host organization, the amount of data or the number of times that the host actually provided information to the different organization may be displayed.

The sharing history display field 1305 displays a transition (history) for a sharing scope and shared details (such as no sharing, raw data sharing, encrypted sharing, or sharing of only determination results) with respect to a different organization, for the threat information specified by the data selection field 1303.

Note that the sharing status detailed information display screen 1301 may display information other than those described above and, for example, may display information regarding a reliability level that the different organization has with respect to the host organization.

With the sharing status detailed information display screen 1301 as above, users in each organization can recognize details of the status of information sharing with a different organization.

Second Embodiment

Figure 14:
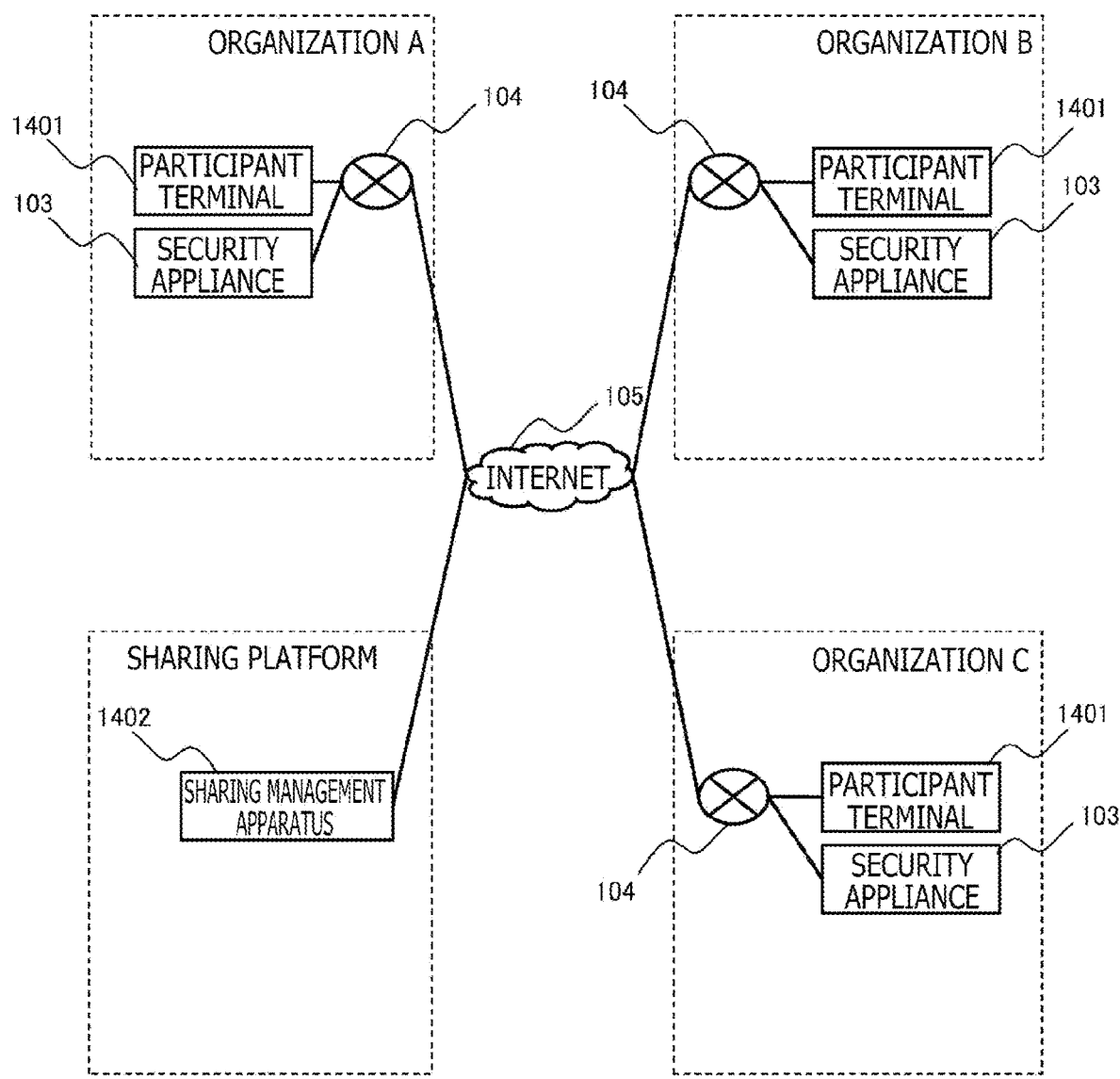
FIG. 14 is a view for describing an example of a configuration of an information sharing system according to a second embodiment.

FIG. 14 is a view for describing an example of a configuration of an information sharing system 2 according to a second embodiment. The information sharing system 2 differs from the corresponding system in the first embodiment, in that it has a sharing management apparatus 1402 that is provided with a configuration similar to those of the receiving apparatus 101 and the transmitting apparatus 102 in each information management system 10 according to the first embodiment. The sharing management apparatus 1402 supervises processing corresponding to processing performed by the receiving apparatus 101 and the transmitting apparatus 102 in each information management system 10 according to the first embodiment.

In addition, each information management system 10 in the information sharing system 2 is provided with a participant terminal 1401. The participant terminal 1401 realizes functionality not held by the receiving apparatus 101 and the transmitting apparatus 102. In other words, the participant terminal 1401 stores data and executes a program that is not to be transferred to the sharing management apparatus 1402.

Even with the above configuration, it is possible to achieve an effect similar to that of the information sharing system 1 according to the first embodiment.

As above, the information management system 10 according to the present embodiment receives, from an information management system 10 belonging to a different party, threat information detected by this information management system 10, calculates a reliability level with respect to the different party, calculates a confidence level for the threat information based on the threat information and the reliability level, determines, based on the calculated confidence level, a countermeasure process (detection or a preventive measure with respect to the threat) with respect to the threat indicated by the threat information, and changes the reliability level based on the result.

In other words, the information management system 10 can, based on a reliability level with respect to a different organization (different party) that has provided threat information, calculate a confidence level for this threat information, and thereby carry out a countermeasure with respect to this threat. The reliability level with respect to the different organization is changed based on this result. In other words, the information management system 10 can give feedback to the different organization, according to a result of a countermeasure process performed with respect to threat information provided from the different party.

In this manner, by virtue of the information management system 10 according to the present embodiment, it is possible to increase the possibility of effective processing based on information obtained from a different party.

Note that the present embodiment is configured as the information sharing system 1 that is provided with a plurality of information management systems 10, whereby it is possible for the independent organizations to oppose a threat collaboratively.

In other words, the information management system 10 according to the present embodiment has a mechanism for combining items of information collected from a plurality of organizations. As a result, it is possible to solve the conventional problem of determinations by a plurality of organizations with respect to the information being irregular and not being able to effectively use each item of information. For example, it is possible to solve the problem that, with respect to a certain threat, if there are organizations that provide information that a certain website is suspicious and there are also organizations that provide information that the certain website is normal, determinations in this case are irregular and an effective countermeasure with respect to the threat is not possible.

In addition, the information management system 10 according to the present embodiment, in the case of having received a request from an information management system 10 belonging to a different party (different organization) to transmit threat information, determines a scope or details of threat information to transmit with respect to this transmission request, based on a reliability level with respect to this different organization, and transmits this threat information to this different organization.

In this manner, it is possible to change the details and scope for the provision of threat information according to the reliability level with respect to a different organization, whereby it is possible to supply only appropriate threat information to the different organization. For example, it is possible to provide more threat information to a different organization that has provided beneficial threat information and that can be trusted.

In addition, the information management system 10 according to the present embodiment, in the case of receiving a threat information transmission request from an information management system 10 belonging to a different party (different organization), changes the scope and details for the provision of threat information based on a confidentiality level for threat information managed by the host organization, whereby it is possible to flexibly provide the different organization with threat information that corresponds to the status of the host organization.

In addition, in a case where a threat indicated by threat information provided from a different party (different organization) is actually unauthorized information processing (a case where the information indicates the presence of wrongdoing), the information management system 10 according to the present embodiment increases the reliability level with respect to this different organization, and decreases the reliability level with respect to the different organization in a case where a threat indicated by threat information is not information processing that is actually unauthorized. As a result, it is possible to supply objective and impartial feedback to the different organization.

In addition, in a case where a threat indicated by threat information provided by a different party (different organization) has actually been unauthorized information processing, the information management system 10 according to the present embodiment increases the reliability level according to the certainty level held by this different organization, and decreases the reliability level according to the certainty level in a case where the threat has not actually been unauthorized information processing. In this manner, the degree of increase or decrease of the reliability level changes according to a subjective determination by the different organization, whereby it is possible to supply the different organization with feedback that is effective for the different organization.

In addition, according to the reliability level with respect to a different organization, the information management system 10 according to the present embodiment provides threat information to the different organization in the form of "raw data sharing," "encrypted data sharing," "sharing of only determination result," or "sharing of only common portion." As a result, it is possible to provide the different organization with threat information that is appropriate for the nature of the threat information.

In addition, the information management system 10 according to the present embodiment displays information (providable data) regarding a scope or details of threat information that can be transmitted to a different organization or information (obtainable data) regarding a scope or details of threat information that can be received from a different organization, whereby users in each organization can recognize a scope of threat information that can be shared.

In addition, the information management system 10 according to the present embodiment displays a history of access with respect to another information management system 10 and in relation to threat information, or a history of a scope or details of threat information shared in accordance with this, whereby a user can recognize details of threat information sharing.

The present invention is not limited to the embodiment described above and can be implemented using any components within a scope that does not deviate from the substance thereof. The embodiment and variations described above are purely examples, and the present invention is not limited to the details of these unless the features of the invention are impaired. Description has been given for various embodiments or variations above, but the present invention is not limited to the details of these. Other aspects that can be considered to be within the scope of the technical concept of the present invention are also included within the scope of the present invention.

For example, configurations of the functional units described in the present embodiment are examples, and, for example, functionality of a portion of a certain functional unit may be provided in another functional unit, or a certain functional unit may be divided into a plurality of functional units. A plurality of functional units may be combined into one functional unit. One or more functional units within one apparatus may be distributed among a plurality of apparatuses and caused to perform processing in cooperation.

Information managed by the information management system 10 being threat information is presupposed in the present embodiment, but the information may be another type of information such as important business information that is shared among organizations. In this case, instead of information actually indicating the presence of wrongdoing as in the present embodiment, information regarding a true positive may indicate that information is appropriate or important, for example.

Alternatively, information managed by the information management system 10 may be information regarding a different field, such as information pertaining to the environment. For example, it may be information that a sensor held by a different organization has detected. It may be that sensor information obtained from one or more organizations is evaluated based on reliability levels and, in the case of information obtained from a plurality of organizations, they are combined to thereby determine a countermeasure process.

LIST OF REFERENCE SYMBOLS

1: Information sharing system
10: Information management system
121: Data processing unit
122: Reliability level updating unit
124: Countermeasure process setting unit

The invention claimed is:

1. An information management system having a processor and a memory, that when executed by the processor, performs:
   receiving, from an information processing apparatus corresponding to a different party, information managed by the different party, calculating a reliability level with respect to the different party, and calculating a confidence level with respect to the information based on the received information and the calculated reliability level;
   determining, based on the calculated confidence level, details of a countermeasure process with respect to details indicated by the information; and
   changing the reliability level based on the details of the countermeasure process,
   wherein
   the determining performs, as the countermeasure process with respect to the information, a process for determining whether the information indicates presence of wrongdoing, and
   the changing of the reliability level increases the reliability level in a case where it is determined that the information indicates the presence of wrongdoing, and decreases the reliability level in a case where it is determined that the information does not indicate the presence of wrongdoing, and
   wherein
   the changing of the reliability level increases the reliability level according to a certainty level that is a parameter indicating a degree to which the different party is certain that the information is actually unauthorized, in a case where it is determined that the information indicates the presence of wrongdoing, and decreases the reliability level according to the certainty level in a case where it is determined that the information does not indicate the presence of wrongdoing.

2. The information management system according to claim 1, further comprising:
   determining, in a case where a request to transmit the information is received from the information processing apparatus corresponding to the different party, based on the reliability level with respect to the different party, a scope or details of the information to transmit with respect to the request to transmit, and transmitting information regarding the determined scope or details to the information processing apparatus corresponding to the different party.

3. The information management system according to claim 2, wherein
the determining, in a case of having received the request to transmit the information from the information processing apparatus corresponding to the different party, based on the reliability level with respect to the information processing apparatus corresponding to the different party and a confidentiality level for the information, the scope or details of the information to transmit with respect to the request to transmit.

4. The information management system according to claim 2, wherein
the determining, in a case of having received the request to transmit the information from the information processing apparatus corresponding to the different party, determines, as the scope or details of the information to transmit with respect to the request to transmit, and based on the reliability level with respect to the different party, at least one of transmitting the information to the information processing apparatus corresponding to the different party without processing the information, transmitting to the information processing apparatus corresponding to the different party the information after processing the information, transmitting to the information processing apparatus corresponding to the different party a result of predetermined processing executed based on the information, or transmitting to the information processing apparatus corresponding to the different party information within a scope of information transmitted in the past by the information processing apparatus corresponding to the different party.

5. The information management system according to claim 2, comprising:
displaying at least one of information regarding a scope or details of the information that can be transmitted to the information processing apparatus corresponding to the different party in a case where the request to transmit is received, or a scope or details of the information that can be received from the information processing apparatus corresponding to the different party in a case where a request to transmit is transmitted to the information processing apparatus corresponding to the different party.

6. The information management system according to claim 2, comprising:
displaying at least one of a history of transmission or reception of the request to transmit, or a history of a scope or details of information that is transmitted or received with respect to the request to transmit and that is determined by transmission or reception of the request to transmit.

7. An information management method executed by an information processing apparatus, comprising:
a data process for receiving, from an information processing apparatus corresponding to a different party, information managed by the different party, calculating a reliability level with respect to the different party, and calculating a confidence level with respect to the information based on the received information and the calculated reliability level;
a countermeasure process setting process for, based on the calculated confidence level, determining details of a countermeasure process with respect to details indicated by the information; and
a reliability level updating process for changing the reliability level based on the details of the countermeasure process,
wherein
the countermeasure process setting process performs, as the countermeasure process with respect to the information, a process for determining whether the information indicates presence of wrongdoing, and
the reliability level updating process increases the reliability level in a case where it is determined that the information indicates the presence of wrongdoing, and decreases the reliability level in a case where it is determined that the information does not indicate the presence of wrongdoing, and
wherein
the reliability level updating process increases the reliability level according to a certainty level that is a parameter indicating a degree to which the different party is certain that the information is actually unauthorized, in a case where it is determined that the information indicates the presence of wrongdoing, and decreases the reliability level according to the certainty level in a case where it is determined that the information does not indicate the presence of wrongdoing.

8. A non-transitory computer readable medium having a plurality of information management systems each having a processor and a memory and storing instructions that when executed by the processor perform:
receiving, from an information processing apparatus corresponding to a different party, information managed by the different party, calculating a reliability level with respect to the different party, and calculating a confidence level with respect to the information based on the received information and the calculated reliability level,
determining, based on the calculated confidence level, details of a countermeasure process with respect to details indicated by the information, and
changing the reliability level based on the details of the countermeasure process,
wherein
the determining performs, as the countermeasure process with respect to the information, a process for determining whether the information indicates presence of wrongdoing, and
the changing of the reliability level increases the reliability level in a case where it is determined that the information indicates the presence of wrongdoing, and decreases the reliability level in a case where it is determined that the information does not indicate the presence of wrongdoing, and
wherein
the changing of the reliability level increases the reliability level according to a certainty level that is a parameter indicating a degree to which the different party is certain that the information is actually unauthorized, in a case where it is determined that the information indicates the presence of wrongdoing, and decreases the reliability level according to the certainty level in a case where it is determined that the information does not indicate the presence of wrongdoing.

* * * * *